Oct. 19, 1937.  S. ROMEO  2,096,651
SANITARY DOUCHE PAN
Filed Nov. 11, 1936
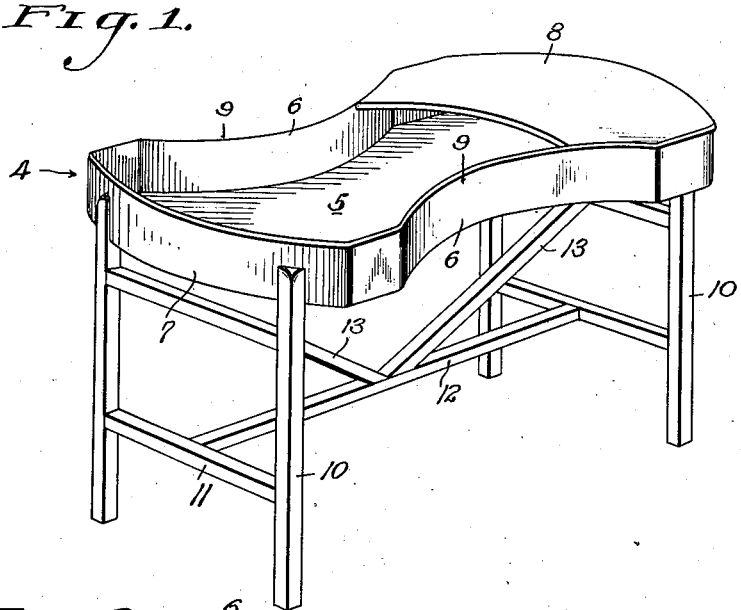
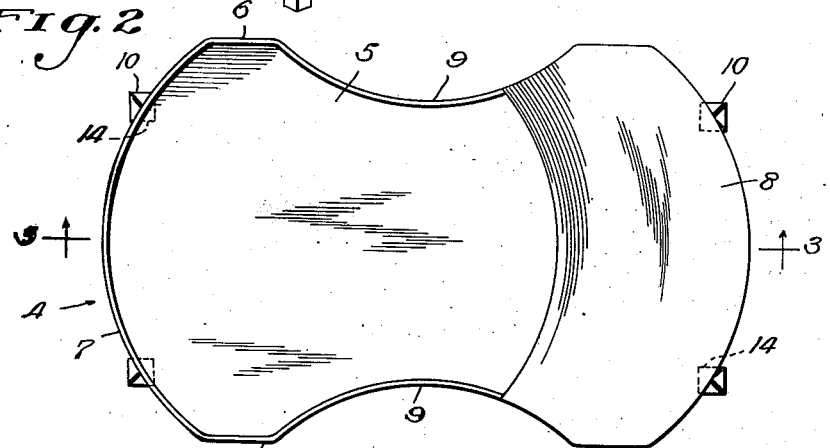
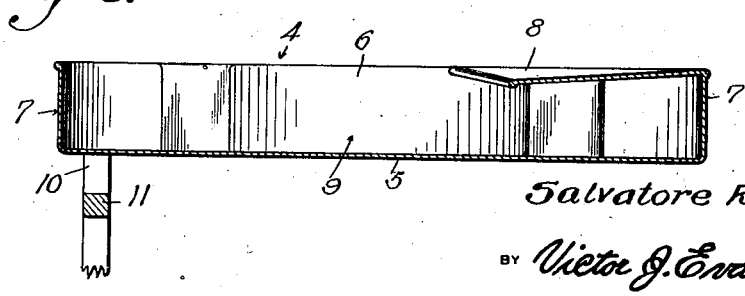
Salvatore Romeo
INVENTOR
BY Victor J. Evans & Co.
ATTORNEYS Patented Oct. 19, 1937

2,096,651

UNITED STATES PATENT OFFICE 2,096,651

SANITARY DOUCHE PAN

Salvatore Romeo, Corona, N. Y.

Application November 11, 1936, Serial No. 110,371

4 Claims. (Cl. 4—6)

The present invention relates to sanitary douche or bed pans and has for its general object the provision of a receptacle of this character which may be used with equal facility either in a standing position astride the pan or in a sitting or prone position and without discomfort to the patient.

Another object resides in the provision of a douche pan having for use therewith a supporting structure or stand on which the pan is removably positioned so as to permit the use of the pan in any of the positions above mentioned and further to provide for convenient removal of the pan from the stand to facilitate emptying and cleaning of same.

The invention will be fully and comprehensively understood from a consideration of the following detailed description when read in connection with the accompanying drawing which forms part of the application.

In the drawing:

Fig. 1 is a perspective view of the douche pan on the stand for same.

Fig. 2 is a plan view of the device as illustrated in Fig. 1; and

Fig. 3 is a longitudinal section taken on line 3—3 of Fig. 2.

Referring now to the drawing for a more detailed description thereof, the numeral 4 indicates generally the douche pan preferably of shallow structure and comprising a bottom member 5 and up-standing side walls 6 and end walls 7, the latter being arcuately formed substantially as illustrated. The pan 4 is open on a substantial portion of its top area and has arranged thereon, preferably at one end, a platform 8 secured at its periphery to the walls 6 and 7 and being inclined toward the center of the pan 4.

The pan 4 is constricted at its intermediate portion to form arcuate recesses 9. The preferred structure for support of the pan 4 is illustrated substantially in Fig. 1 and comprises a plurality of uprights for legs 10 forming a frame structure including cross pieces 11 extending between pairs of the legs 10 and a stretcher member 12 joining pairs of cross pieces 11 and having brace members 13 secured thereto so as to reinforce the legs 10. In order to removably retain the pan 4 on the frame structure comprising the legs 10 the latter are each notched out at the upper end thereof to form a shoulder portion 14. The bottom 5 of the pan 4 rests against the shoulders 14 and the adjacent free end of the legs 10 extend in contact with the end walls 7 of the pan 4.

It will be apparent that the douche pan of the invention may be used in a sitting position, in that the patient may occupy same by being seated on the platform 8 provided mainly for this purpose. The platform 8 may also serve in emptying the pan 4 as a baffle to prevent spilling the contents.

When the douche pan is to be used with the patient in standing position, the patient assumes a posture astride the pan with the legs of the user disposed in the arcuate recesses 9, the supporting frame being of such height as to support the pan at the proper elevation.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed as new is:

1. A device of the character described comprising a substantially rectangular pan having upstanding end and longitudinal walls, said longitudinal walls being arcuately directed to present a constricted intermediate formation of said pan, a portion of said pan being covered by a platform mounted on said longitudinal walls and integrally united therewith.

2. A device of the character described comprising a substantially rectangular pan having upstanding end and longitudinal walls, said longitudinal walls being arcuately directed to present a constricted intermediate formation of said pan, a portion of said pan being covered by a platform mounted on said longitudinal walls and integrally united therewith, and a supporting structure for said pan comprising a plurality of uprights having shoulder portions thereon for engagement with said pan.

3. A device of the character described comprising a substantially rectangular pan having upstanding end and longitudinal walls, said longitudinal walls being arcuately directed to present a constricted intermediate formation of said pan, a portion of said pan being covered by a platform, disposed in substantially parallel relationship relative to the bottom of said pan, said platform being mounted on said longitudinal walls and integrally united therewith by substantially fluid-impervious sealing means, and a framework for support of said pan comprising a plurality of interconnected uprights, each of said uprights being cut away at the top end to form a step for engagement with said pan.

4. A douche pan of the type herein described comprising a substantially rectangular pan comprising a substantially horizontal bottom and a plurality of substantially vertical sides, said pan being arcuately recessed in the sides thereof in a manner to conform with the user's body, a substantially flat and imperforate platform mounted on said vertical side pieces and integrally united therewith whereby a relatively fluid-impervious seal is established between said platform and said side pieces.

SALVATORE ROMEO.